United States Patent
Kurtz et al.

(10) Patent No.: US 7,462,977 B2
(45) Date of Patent: Dec. 9, 2008

(54) HIGH TEMPERATURE PRESSURE TRANSDUCER HAVING A SHAPED CERAMIC FACE

(75) Inventors: Anthony D. Kurtz, Saddle River, NJ (US); Adam Kane, Morristown, NJ (US); Andrew Schwartz, Randolph, NJ (US)

(73) Assignee: Kulite Semiconductor Products, Inc, Leonia, NJ (US)

( * ) Notice: Subject to any disclaimer, the term of this patent is extended or adjusted under 35 U.S.C. 154(b) by 585 days.

(21) Appl. No.: 11/100,682

(22) Filed: Apr. 7, 2005

(65) Prior Publication Data

US 2006/0226738 A1 Oct. 12, 2006

(51) Int. Cl.
*H01L 41/08* (2006.01)
(52) U.S. Cl. .................................... 310/338
(58) Field of Classification Search ............... 310/338; 338/4; 73/723, 706; *H01I 41/08*
See application file for complete search history.

(56) References Cited

U.S. PATENT DOCUMENTS

| | | | |
|---|---|---|---|
| 4,578,611 A * | 3/1986 | Sadler | 310/338 |
| 5,038,069 A * | 8/1991 | Lukasiewicz et al. | 310/338 |
| 5,165,283 A | 11/1992 | Kurtz et al. | |
| 5,298,767 A | 3/1994 | Shor et al. | |
| 5,303,594 A | 4/1994 | Kurtz et al. | |
| 5,359,214 A | 10/1994 | Kurtz et al. | |
| 5,376,241 A | 12/1994 | Shor et al. | |
| 5,376,860 A * | 12/1994 | Sato | 310/338 |
| 5,398,194 A | 3/1995 | Brosh et al. | |
| 5,401,672 A | 3/1995 | Kurtz et al. | |
| 5,425,841 A | 6/1995 | Kurtz et al. | |
| 5,428,985 A | 7/1995 | Kurtz et al. | |
| 5,454,915 A | 10/1995 | Shor et al. | |
| 5,455,445 A | 10/1995 | Kurtz et al. | |
| 5,473,944 A | 12/1995 | Kurtz et al. | |
| 5,517,073 A * | 5/1996 | Ohkuma | 310/338 |
| 5,539,236 A | 7/1996 | Kurtz et al. | |
| 5,543,349 A | 8/1996 | Kurtz et al. | |
| 5,549,006 A | 8/1996 | Kurtz | |
| 5,569,932 A | 10/1996 | Shor et al. | |
| 5,574,295 A | 11/1996 | Kurtz et al. | |
| 5,587,601 A | 12/1996 | Kurtz | |
| 5,597,738 A | 1/1997 | Kurtz et al. | |
| 5,604,144 A | 2/1997 | Kurtz | |

(Continued)

*Primary Examiner*—Darren Schuberg
*Assistant Examiner*—Karen Beth Addison
(74) *Attorney, Agent, or Firm*—Arthur L. Plevy

(57) ABSTRACT

A high temperature pressure transducer includes an extended tubular member having an opening from a front to a back surface. The tubular member is preferably fabricated from a metal. At the front end of the tubular member is a ceramic sensor face or tip which basically is a ceramic disk having a curved front surface and having an extending stem and which is inserted into the front opening of the tubular member. The column is of a given length and terminates in a back end. The back end has a predetermined portion which consists of two flat surfaces each on opposite sides. The back end containing the flat surfaces is thinner than the thickness of the column. On these flat surfaces are positioned suitable semiconductor piezoresistors. When a force is applied to the ceramic sensor face, it is transmitted axially through the tube or column where it is received by the sensors positioned on the flats. The sensors produce an output indicative of the force applied. The sensors may be arranged in a suitable bridge configuration.

10 Claims, 2 Drawing Sheets

U.S. PATENT DOCUMENTS

| | | | |
|---|---|---|---|
| 5,614,678 A | 3/1997 | Kurtz et al. | |
| 5,622,902 A | 4/1997 | Kurtz et al. | |
| 5,686,826 A | 11/1997 | Kurtz et al. | |
| 5,702,619 A | 12/1997 | Kurtz et al. | |
| 5,750,898 A | 5/1998 | Kurtz et al. | |
| 5,789,793 A | 8/1998 | Kurtz et al. | |
| 5,834,378 A | 11/1998 | Kurtz et al. | |
| 5,852,245 A * | 12/1998 | Wesling et al. | 73/723 |
| 5,891,751 A | 4/1999 | Kurtz et al. | |
| 5,926,692 A | 7/1999 | Kurtz | |
| 5,939,732 A | 8/1999 | Kurtz et al. | |
| 5,955,771 A | 9/1999 | Kurtz et al. | |
| 5,973,590 A | 10/1999 | Kurtz et al. | |
| 5,999,082 A | 12/1999 | Kurtz et al. | |
| 6,034,001 A | 3/2000 | Shor et al. | |
| 6,058,782 A | 5/2000 | Kurtz et al. | |
| 6,127,770 A * | 10/2000 | Hauser et al. | 310/338 |
| 6,147,437 A * | 11/2000 | Matsumoto et al. | 310/338 |
| 6,210,987 B1 | 4/2001 | Kurtz et al. | |
| 6,210,989 B1 | 4/2001 | Kurtz et al. | |
| 6,225,647 B1 | 5/2001 | Kurtz et al. | |
| 6,229,427 B1 | 5/2001 | Kurtz et al. | |
| 6,235,611 B1 | 5/2001 | Kurtz et al. | |
| 6,272,928 B1 | 8/2001 | Kurtz | |
| 6,272,929 B1 | 8/2001 | Kurtz et al. | |
| 6,293,154 B1 | 9/2001 | Kurtz | |
| 6,326,682 B1 | 12/2001 | Kurtz et al. | |
| 6,327,911 B1 | 12/2001 | Kurtz et al. | |
| 6,330,829 B1 | 12/2001 | Kurtz et al. | |
| 6,363,792 B1 | 4/2002 | Kurtz et al. | |
| 6,401,541 B1 | 6/2002 | Kurtz | |
| 6,424,017 B2 | 7/2002 | Kurtz et al. | |
| 6,446,510 B1 | 9/2002 | Kurtz et al. | |
| 6,523,415 B2 | 2/2003 | Kurtz et al. | |
| 6,530,282 B1 | 3/2003 | Kurtz et al. | |
| 6,543,291 B1 | 4/2003 | Kurtz et al. | |
| 6,543,293 B1 | 4/2003 | Kurtz et al. | |
| 6,545,610 B2 | 4/2003 | Kurtz et al. | |
| 6,564,644 B1 | 5/2003 | Kurtz | |
| 6,577,224 B2 | 6/2003 | Kurtz | |
| 6,588,281 B2 | 7/2003 | Kurtz et al. | |
| 6,591,686 B1 | 7/2003 | Kurtz | |
| 6,593,209 B2 | 7/2003 | Kurtz et al. | |
| 6,595,066 B1 | 7/2003 | Kurtz et al. | |
| 6,601,455 B2 | 8/2003 | Kurtz et al. | |
| 6,612,178 B1 | 9/2003 | Kurtz et al. | |
| 6,612,179 B1 | 9/2003 | Kurtz | |
| 6,612,180 B1 | 9/2003 | Kurtz | |
| 6,642,594 B2 | 11/2003 | Kurtz | |
| 6,688,182 B2 | 2/2004 | Kurtz et al. | |
| 6,689,669 B2 | 2/2004 | Kurtz et al. | |
| 6,691,581 B2 | 2/2004 | Kurtz et al. | |
| 6,700,473 B2 | 3/2004 | Kurtz et al. | |
| 6,727,524 B2 | 4/2004 | Kurtz | |
| 6,795,465 B2 | 9/2004 | Kurtz et al. | |
| 6,811,912 B2 | 11/2004 | Kurtz | |
| 6,813,956 B2 | 11/2004 | Kurtz et al. | |
| 6,848,307 B1 | 2/2005 | Kurtz et al. | |
| 6,856,938 B2 | 2/2005 | Kurtz | |
| 6,861,276 B2 | 3/2005 | Kurtz | |
| 6,871,487 B2 | 3/2005 | Kurtz et al. | |
| 6,877,379 B2 | 4/2005 | Kurtz et al. | |
| 6,891,711 B1 | 5/2005 | Kurtz | |
| 6,895,822 B2 | 5/2005 | Kurtz et al. | |
| 6,900,108 B2 | 5/2005 | Kurtz et al. | |
| 6,935,184 B2 | 8/2005 | Kurtz | |
| 6,941,816 B2 | 9/2005 | Kurtz et al. | |
| 7,000,484 B2 | 2/2006 | Kurtz et al. | |
| 7,034,700 B2 | 4/2006 | Kurtz et al. | |

* cited by examiner

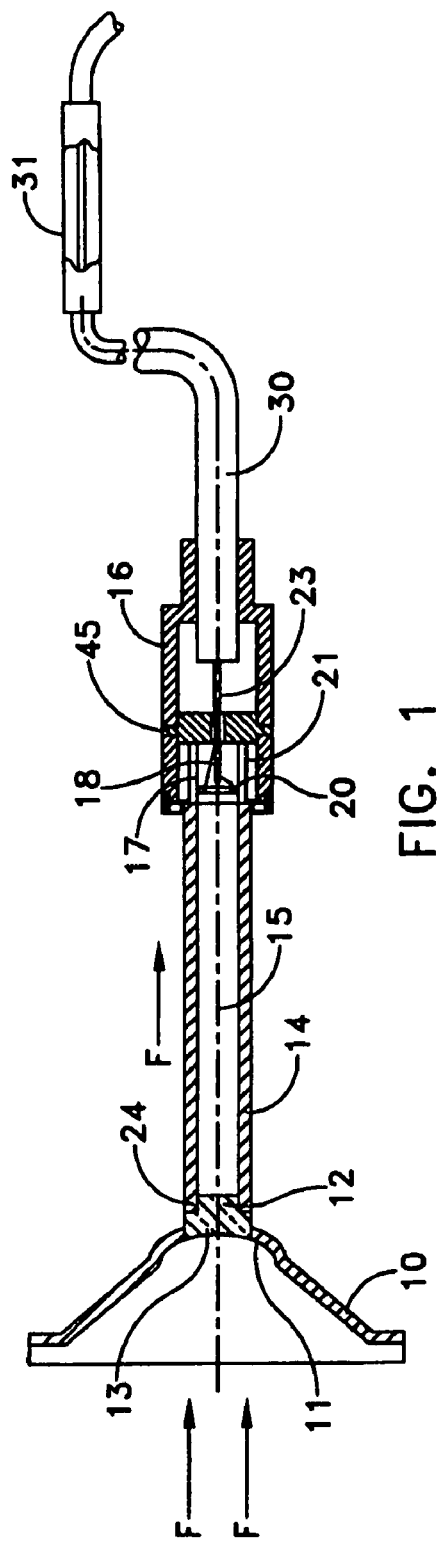
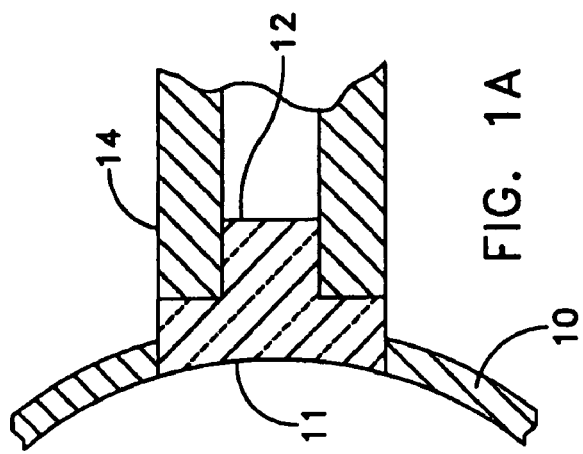

HIGH TEMPERATURE PRESSURE TRANSDUCER HAVING A SHAPED CERAMIC FACE

FIELD OF THE INVENTION

This invention relates to pressure transducers and more particularly to a high temperature pressure transducer having a shaped ceramic face particularly for use in injection molding operations.

BACKGROUND OF THE INVENTION

As is well known, pressure transducers are utilized in many applications including applications where the transducer has to operate at high temperatures and high pressures.

One application for the use of a pressure transducer is for monitoring processes occurring in plastic injection molding or extrusion. As one can ascertain, these processes are associated with very high temperatures and relatively high pressures. Normally a pressure transducer is placed within an aperture formed in the cavity of a mold. The pressure transducer measures pressure in the closed cavity where the surface of the cavity is curved with respect to the measuring face of the transducer.

If the face of a transducer is flat with respect to its longitudinal axis, when it is inserted into the cavity, it will either protrude into the cavity or leave a gap. This creates a problem in operation and proper positioning of the transducer.

The present invention overcomes this problem by employing a transducer face that has substantially the same curvature as the surface of the cavity into which the transducer is inserted.

While the above noted pressure transducer is applicable for use with mold cavities such as found in injection molding and similar equipment, the concept can also be employed for the measurement of pressures associated with high temperatures in other environments which have curved or arcuate surfaces.

SUMMARY OF THE INVENTION

A high temperature pressure transducer, comprising a tubular member of a given length and thickness, the tubular member having a front opening and a back opening, with a specified length of the back end of the member near the back opening being thinner then the thickness of the tubular member; a ceramic member covering the front opening and adapted to receive an applied pressure; at least one pressure sensor mounted on the thinner surface of the back end of the tubular member whereby when a pressure is applied to the ceramic member it is converted to an axial stress by the tubular member to cause the pressure sensor to provide an output proportional to the applied pressure.

BRIEF DESCRIPTION OF THE FIGURES

FIG. 1 is a cross sectional view of a pressure transducer according to an embodiment of the present invention. FIG. 1 is symmetrical and therefore the right and left cross sectional views are the same.

FIG. 1A is a cross sectional view of a ceramic tip member used with the pressure transducer of FIG. 1.

DETAILED DESCRIPTION OF THE INVENTION

Figure 3:
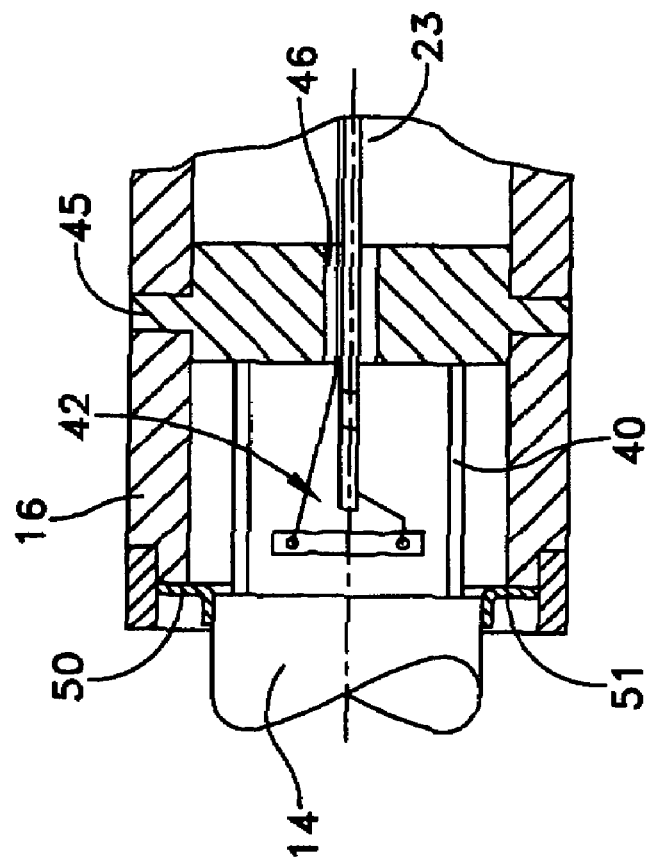
FIG. 3 is an exploded view of the circled portion of FIG. 1.

Referring to FIG. 1, there is a shown a mold cavity 10. The cavity 10 is of the type that can be employed in an injection molding or extrusion system. The cavity 10 as shown is of arbitrary shape and it is understood that any particular type of cavity can be employed. Mold cavities often have curved or arcuate surfaces at which the pressure is to be measured. This can be at the bottom end of the cavity, for example. The cavity 10 includes aperture 13. Positioned within the aperture is a ceramic tip 12. The ceramic tip has a curved or arcuate face which corresponds to the mold cavity surface. The ceramic tip 12 as seen in FIG. 1 possesses substanially the same curvature as the inside of the mold cavity.

FIG. 1a shows a more detailed cross section of the ceramic tip 12. As seen, the ceramic tip 12 has a front surface 11 which is curved. It is understood that the ceramic tip is circular in nature as is the stem end 24 of the tip. The tip 12 has the curved front 11 extending into a rear stem portion 24.

It is also understood that the ceramic tip can be shaped for any appropriate curvature and can be replaced with another face to obtain a more perfect fit in the mold for different applications.

Since most plastic molding processes employ high pressure and temperatures it is advantageous to form the transducer face of ceramic. The transducer face which is formed of ceramic has a stem end 24 which is inserted into a central aperture 15 of a metal tube or column 14. Thus the tip 12 covers the front opening of the tube 14.

The metal tube 14 or column is of a selected length which one can ascertain from FIG. 1 is much greater than the actual width of the ceramic tip. When pressure is exerted on the ceramic face, it is converted to axial stress in the column. A force F when exerted on the mold would be exerted on the curved face 11 of the ceramic tip and transferred to the column 14.

The curved face of the ceramic tip is co-extensive with the stem 12, which stem 12 is inserted into the front aperture 15 of the column 14. The ceramic tip is epoxied or otherwise fastened to the aperture in the column by means of a high temperature adhesive for example. Such adhesives may include high temperature expoxies or for example may comprise a glass frit. The stem can also be force fitted.

In many applications the stem 12 is force fitted into the aperture 15 associated with the column 14. The column 14 has an end which is more clearly shown in FIG. 3. The end of the column has two flats which are spaced 180° (degrees) apart and has a hollow central section 15.

Silicon strain gauges designated by reference numerals 18 and 20 are placed on the flat surface. Suitable wires 23 are directed from the silicon sensors into a cable 30 which also includes a compensating module 31. Such compensating modules and cable are well known in the art, and as such their description is omitted herein for brevity.

The flat ends of the tube 14 accommodate the pressure sensors. The flat ends include active areas 17 and 20 which operate as diaphragms to enable the force which is applied to the ceramic surface 11 to be transmitted via the tube 14 as an axial force which provides a pressure on sensors 18 and 20. An additional housing 16, encircles the wires and is joined to the metal tube by means of a flange.

Figure 2:
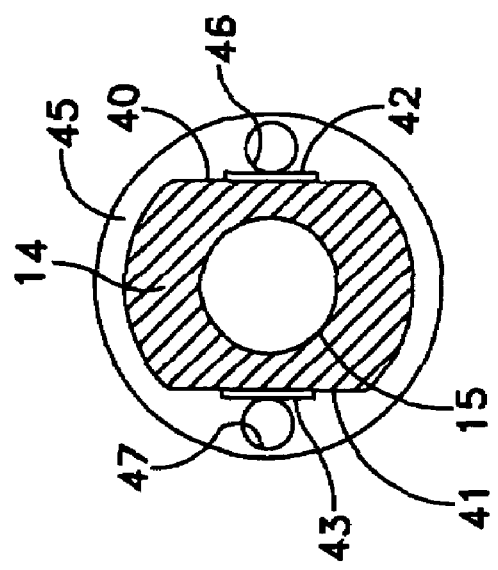
FIG. 2 is a front view of a tube which is employed with the pressure transducer according to an embodiment of the present invention.

Referring to FIG. 2 there is shown a rear view of the tube 14 showing the flattened portions. The central aperture 15 is shown whereby the metal tube 14 is shown with flats 40 and 41. Disposed on the flats are pressure sensors 42 and 43.

There is shown the rear view of a plate 45 which is seen in FIG. 1 as well. The plate 45 has suitable apertures as 46, 47 to enable wires 23 from the sensors to be directed through the apertures into the cable 30 as shown in FIG. 1.

FIG. 3 depicts a more detailed view of some of the elements as shown in FIG. 1 and FIG. 2. Like reference numerals have been utilized to refer to corresponding parts. As seen in FIG. 3 a sensor arrangement 42 which may be a half bridge or a full Wheatstone bridge is secured to the flat surface 40 of the end of the metal tube 14.

The sensor arrangement has wires 23 directed through the aperture 46 which appears in the disc 45. The tube is otherwise coupled to the housing 16 by various means including, for example, a protruding L-shaped bracket 50, 51 secured to an outer surface of the housing to accommodate and hold the tube in place. The silicon semiconductor strain gauges 42 are affixed to the column or to the flat portions of the column by means of a glass frit or other high temperature seal to insure high temperature operation.

By extending the length of the column and using a ceramic sensor face, heat flow to the sensors are reduced. Therefore, the sensors can operate at much greater temperatures than conventional sensors. Essentially as can be seen from FIG. 1, the basic pressure transducer consists of an elongated tube 14 having a front curved ceramic tip. The tube has a front opening and a back opening. Positioned in the front opening of the tube is one ceramic tip or ceramic end. The ceramic end has an extending stem portion and a front portion which can be shaped or curved to accommodate the surface of the mold having a particular curvature and to receive the pressure.

In an exemplary configuration, the tube extends a predetermined length towards an end opening. The tube at the end has two flattened surfaces. Mounted on the flattened surfaces are piezoresistors arranged either in a half bridge or a full bridge configuration. The piezoresistors can be arranged as a Poisson bridge arrangement. The flattened areas of the tube enable a thinner active area. In this manner, when a pressure is applied to the curved surface of the ceramic tip the pressure is transmitted axially down the tube and reaches the remote piezoresistors located on the flats near the end portion of the tube. The piezoresistors are preferably silicon semiconductor strain gauges which are remotely located, due to the length of the column. In this manner, the heat flow to the sensors is substantially reduced, as the column acts as a heat sink with the ceramic sensor face further acting as an insulator material.

Output leads (not shown) are provided to the transducer to enable output signal coupling of the sensor arrangements. Those of ordinary skill in the art may recognize that many modifications and variations of the present invention may be implemented without departing from the spirit or scope of the invention. Thus, it is intended that the present invention covers the modifications and variation of this invention.

What is claimed is:

1. A high temperature pressure transducer, comprising:
a tubular member of a given length and thickness, said tubular member having a front opening and a back opening, with a specified length of the back end of said member near said back opening being thinner than the thickness of said tubular member;
a ceramic member covering said front opening and adapted to receive an applied pressure;
at least one pressure sensor mounted on said thinner surface of said back end of said tubular member whereby when a pressure is applied to the ceramic member it is converted to an axial stress by said tubular member to cause said pressure sensor to provide an output proportional to said applied pressure.

2. The high temperature transducer according to claim 1, wherein said ceramic member has a front surface of a given curvature and of a diameter greater than that of said front opening in said tubular member to enable said ceramic member to be inserted into a mold having a curved cavity surface, with said given curvature of said front surface of said ceramic member corresponding to said curvature of said cavity surface.

3. The high temperature transducer according to claim 2, wherein said ceramic member has a stem portion extending from the rear of said front surface and adatped to be inserted into said front opening of said tubular member to enable said front surface of said ceramic member to cover said front opening of said tubular member.

4. The high temperature transducer according to claim 1, wherein said back end of said tubular member has a first flat thin surface on one side and a second flat thin surface on the opposite side, with at least one pressure sensor positioned on the first flat surface and at least another pressure sensor positioned on the second flat surface.

5. The high temperature pressure transducer according to claim 1, wherein said pressure sensor is a piezoresistive pressure sensor.

6. The high pressure transducer according to claim 5, wherein said piezoresistive pressure sensor is secured to said thinner surface by means of a glass bond.

7. The high temperature pressure transducer according to claim 6, wherein said glass bond is a glass frit bond.

8. The high temperature pressure transducer according to claim 1, wherein said tubular member is fabricated from a metal.

9. The high temperature pressure transducer according to claim 2, wherein said mold is a plastic injection mold.

10. The high temperature pressure transducer according to claim 4, wherein said first and second pressure sensors are silicon pressure sensors.

* * * * *